US009892243B2

United States Patent
Yamada

(10) Patent No.: US 9,892,243 B2
(45) Date of Patent: Feb. 13, 2018

(54) INFORMATION PROCESSING APPARATUS, INFORMATION PROCESSING METHOD AND NON-TRANSITORY COMPUTER READABLE MEDIUM

(71) Applicant: CANON KABUSHIKI KAISHA, Tokyo (JP)

(72) Inventor: Tetsuya Yamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/556,543

(22) Filed: Dec. 1, 2014

(65) Prior Publication Data
US 2015/0178485 A1    Jun. 25, 2015

(30) Foreign Application Priority Data
Dec. 20, 2013 (JP) ................................ 2013-264506

(51) Int. Cl.
G06F 21/31 (2013.01)
H04L 29/06 (2006.01)
(Continued)

(52) U.S. Cl.
CPC ............ *G06F 21/31* (2013.01); *G06F 21/608* (2013.01); *H04L 9/3236* (2013.01); *H04L 63/08* (2013.01); *H04L 63/083* (2013.01)

(58) Field of Classification Search
CPC ..... G06F 21/31; G06F 21/608; H04L 63/083; H04L 9/3236
See application file for complete search history.

(56) References Cited

U.S. PATENT DOCUMENTS

| 5,719,941 A * | 2/1998 | Swift ..................... G06F 21/31 340/5.54 |
| 8,355,148 B2 | 1/2013 | Yamada et al. |

(Continued)

FOREIGN PATENT DOCUMENTS

JP    2011-199718 A    10/2011

OTHER PUBLICATIONS

Thomas Pomin, "Why passwords should be hashed," (Jan. 11, 2011; Searched on May 13, 2015), Internet <URL: http://www.security.blogoverflow.com/2011/11/why-passwords-should-be-hashed/>.
(Continued)

*Primary Examiner* — Robert Leung
(74) *Attorney, Agent, or Firm* — Fitzpatrick, Cella, Harper & Scinto

(57) ABSTRACT

An information processing apparatus comprises: storage unit that stores a first converted value converted by a one-way function in association with user identification information; input unit that receives, from a user, input of the user identification information and authentication information; holding unit that holds the authentication information input by the user; authentication unit that executes user authentication by converting, by the one-way function, the authentication information input by the user into a second converted value and checking the second converted value against the first converted value stored in the storage unit in association with the user identification information input by the user; and control unit that, based on success of the user authentication, causes the storage unit to store the authentication information held by the holding unit in place of the first converted value stored in the storage unit.

14 Claims, 11 Drawing Sheets

(51) Int. Cl.
   *G06F 21/60*   (2013.01)
   *H04L 9/32*    (2006.01)

(56)  References Cited

U.S. PATENT DOCUMENTS

| | | | |
|---|---|---|---|
| 2001/0005887 A1* | 6/2001 | Boroditsky | G06F 21/31 |
| | | | 713/183 |
| 2002/0026427 A1 | 2/2002 | Kon et al. | |
| 2008/0059810 A1* | 3/2008 | Ishimoto | H04L 9/0822 |
| | | | 713/193 |
| 2008/0077798 A1 | 3/2008 | Nachtigall | |
| 2009/0094461 A1 | 4/2009 | Tamura | |
| 2009/0293134 A1 | 11/2009 | Oomura | |
| 2012/0005579 A1 | 1/2012 | Yamada | |
| 2012/0144471 A1* | 6/2012 | Tsang | H04L 9/3226 |
| | | | 726/7 |
| 2012/0204234 A1 | 8/2012 | Kuroda | |
| 2014/0325622 A1* | 10/2014 | Luk | H04L 63/083 |
| | | | 726/6 |
| 2015/0026784 A1* | 1/2015 | Kurkure | H04L 63/083 |
| | | | 726/7 |
| 2015/0149772 A1* | 5/2015 | Leavy | H04L 9/0822 |
| | | | 713/168 |

OTHER PUBLICATIONS

May 21, 2015 European Search Report in European Patent Appln No. 14003990.0.

\* cited by examiner

FIG. 6

| user_id | password(MD5) | e-mail |
|---|---|---|
| | 601 | 602 | 603 |
| honda | 80b1b3105f273c8b262a69fc4781d623 | honda@oanon.com |
| kagawa | 91d9f409e84ca5b732eebecae4c8564d | kagawa@oanon.com |

FIG. 7

| user_id | password | password(MD4) | password(MD5) | e-mail |
|---|---|---|---|---|
| hasebe | haseb | | | hasebe@oanon.com |
| endo | end | | | endo@oanon.com |

FIG. 8

| user_id | password | password(MD4) | password(MD5) | e-mail |
|---|---|---|---|---|
| hasebe | haseb | | | hasebe@oanon.com |
| endo | end | | | endo@oanon.com |
| honda | | | 80b1b3105f273c8b262a69fc4781d623 | honda@oanon.com |
| kagawa | | | 91d9f409e84ca5b732eebecae4c8564d | kagawa@oanon.com |

FIG. 9

| user_id | password | password(MD4) | password(MD5) | e-mail |
|---|---|---|---|---|
| hasebe | haseb | | | hasebe@oanon.com |
| endo | end | | | endo@oanon.com |
| honda | hond | | | honda@oanon.com |
| kagawa | | | 91d9f409e84ca5b732eebecae4c8564d | kagawa@oanon.com |

F I G. 15

| user_id 1501 | password 1502 | password(MD4) 1503 | password(MD5) 1504 | e-mail 1505 |
|---|---|---|---|---|
| hasebe | haseb | | | hasebe@oanon.com |
| endo | end | | | endo@oanon.com |
| honda | hond | | | honda@oanon.com |
| kagawa | kagawa | | | kagawa@oanon.com |

F I G. 16

| user_id 1601 | password 1602 | password(MD4) 1603 | password(MD5) 1604 | e-mail 1605 |
|---|---|---|---|---|
| hasebe | | | af578b56632be90d9c2e53f2dfcc2b990 | hasebe@oanon.com |
| endo | end | | | endo@oanon.com |
| honda | | | 80b1b3105f273c8b262a69fc4781d623 | honda@oanon.com |
| kagawa | | | 91d9f409e84ca5b732eebecae4c8564d | kagawa@oanon.com |

F I G. 17

| user_id 1701 | password 1702 | password(MD4) 1703 | password(MD5) 1704 | e-mail 1705 |
|---|---|---|---|---|
| hasebe | | | af578b56632be90d9c2e53f2dfcc2b990 | hasebe@oanon.com |
| endo | | 7f021a1415b86f2d013b2618fb31ae53 | | endo@oanon.com |
| honda | | | 80b1b3105f273c8b262a69fc4781d623 | honda@oanon.com |
| kagawa | | | 91d9f409e84ca5b732eebecae4c8564d | kagawa@oanon.com |

INFORMATION PROCESSING APPARATUS, INFORMATION PROCESSING METHOD AND NON-TRANSITORY COMPUTER READABLE MEDIUM

BACKGROUND OF THE INVENTION

1. Field of the Invention

The present invention relates to an information processing apparatus, an information processing method, and a non-transitory computer readable medium and, more particularly, to authentication of a user.

2. Description of the Related Art

When performing user authentication between information processing apparatuses connected to a network, a user password converted by a hash function is often used for authentication. As the hash function to be used, there exist hash functions of different security strengths such as MD4 (Massage Digest Algorithm 4), MD5, and SHA1 (Secure Hash Algorithm 1). The hash function to be used changes depending on the authentication protocol. For example, MD4 is used in NTLM (Windows NT LAN Manager) authentication, and SHA1 is used in SNMPv3 (Simple Network Management Protocol version 3). As the password storage method in an information processing apparatus, a hashed password is often stored. Japanese Patent Laid-Open No. 2011-199718 proposes a method of integrating two hash protocols.

However, if an unhashed password is stored, and hashing is performed in every authentication considering an increase in the number of usable hash functions, the user database need not be extended, and adding hash functions suffices. Note that an unhashed password is normally stored after encrypting a key managed by an information processing apparatus.

When user information including password information is commonly used in an environment where a plurality of information processing apparatuses exist, the user information needs to be synchronized. At this time, when user information is shifted from an information processing apparatus as a reference source that manages a hashed password to an information processing apparatus that manages an unhashed password, the password cannot be returned to the state before hashing because the hash function is a one-way function (irreversibility). As a result, a state in which the user information cannot be synchronized may occur between the information processing apparatuses using different password management methods. In this case, the user needs to shift the password in each information processing apparatus, resulting in heavy load.

SUMMARY OF THE INVENTION

According to one aspect of the present invention, there is provided an information processing apparatus comprising: storage unit configured to store a first converted value converted by a one-way function in association with user identification information; input unit configured to receive, from a user, input of the user identification information and authentication information; holding unit configured to hold the authentication information input by the user using the input unit; authentication unit configured to execute user authentication by converting, by the one-way function, the authentication information input by the user using the input unit into a second converted value and checking the second converted value against the first converted value stored in the storage unit in association with the user identification information input by the user using the input unit; and storage control unit configured, based on success of the user authentication by the authentication unit, to cause the storage unit to store the authentication information held by the holding unit in place of the first converted value stored in the storage unit.

According to another aspect of the present invention, there is provided an information processing method of an information processing apparatus including storage unit configured to store a first converted value converted by a one-way function in association with user identification information, comprising: a reception step of receiving, from a user, input of the user identification information and authentication information; a holding step of holding the input authentication information; an authentication step of executing user authentication by converting the input authentication information into a second converted value based on the one-way function and checking the second converted value against the first converted value stored in the storage unit in association with the input user identification information; and a step of, based on success of the user authentication in the authentication step, causing the storage unit to store the authentication information held in the holding step in place of the first converted value stored in the storage unit.

According to another aspect of the present invention, there is provided an non-transitory computer readable medium storing a program that causes an information processing apparatus including storage unit configured to store a first converted value converted based on a one-way function in association with user identification information to function as: input configured to receive, from a user, input of the user identification information and authentication information; holding configured to hold the authentication information input by the user using the input unit; authentication configured to execute user authentication by converting, by the one-way function, the authentication information input by the user using the input unit into a second converted value and checking the second converted value against the first converted value stored in the storage unit in association with the user identification information input by the user using the input unit; and storage control unit configured, based on success of the user authentication by the authentication unit, to cause the storage unit to store the authentication information held by the holding unit in place of the first converted value stored in the storage unit.

It is possible to minimize the labor of a user and synchronize user information between a plurality of information processing apparatuses using different password management methods.

Further features of the present invention will become apparent from the following description of exemplary embodiments (with reference to the attached drawings).

BRIEF DESCRIPTION OF THE DRAWINGS

FIG. 6 is a view showing an example of a user information management table that manages hashed passwords;

FIG. 7 is a view showing an example of a user information management table that manages unhashed passwords;

FIG. 8 is a view showing an example in which hashed user information is imported to the user information management table that manages unhashed passwords;

FIG. 9 is a view showing an example a user information management table when user authentication has succeeded;

FIG. 15 is a view showing an example of user information according to the fourth embodiment;

FIG. 16 is a view showing an example of data according to the fourth and fifth embodiments; and FIG. 17 is a view showing an example of data according to the fifth embodiment.

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

First Embodiment

The first embodiment of the present invention will be described.

[System Arrangement]

Figure 1:
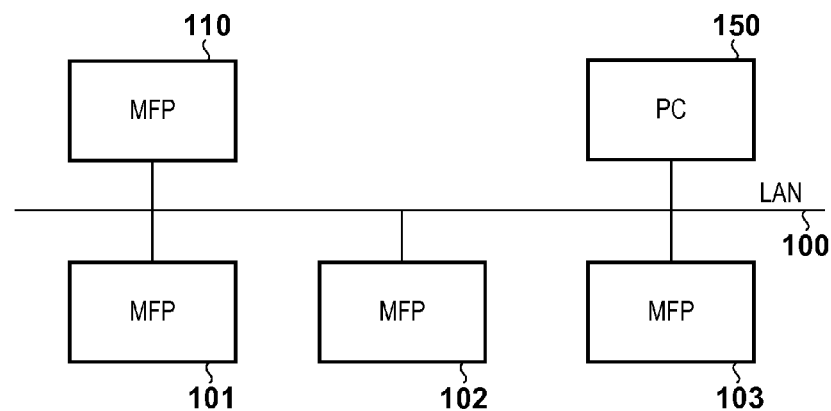
FIG. 1 is a block diagram showing an example of a system arrangement according to the present invention.

FIG. 1 is a block diagram showing an example of the arrangement of an entire system according to the present invention. Components to be described later are connected to a LAN 100. MFPs 101, 102, 103, and 110 are multi-function peripherals and include an image reading apparatus, a printing apparatus, and a communication apparatus. Each MFP has applications of copy, print, scanned image transmission, and the like. Each MFP also has a function of performing user authentication before use of the MFP so as to implement restriction of use of these applications on a user basis, customization on a user basis, and the like.

A PC 150 is a general PC (Personal Computer) in which a web browser (not shown) and the like are installed, and is used to manage each MFP.

[Hardware Arrangement]

Figure 2:
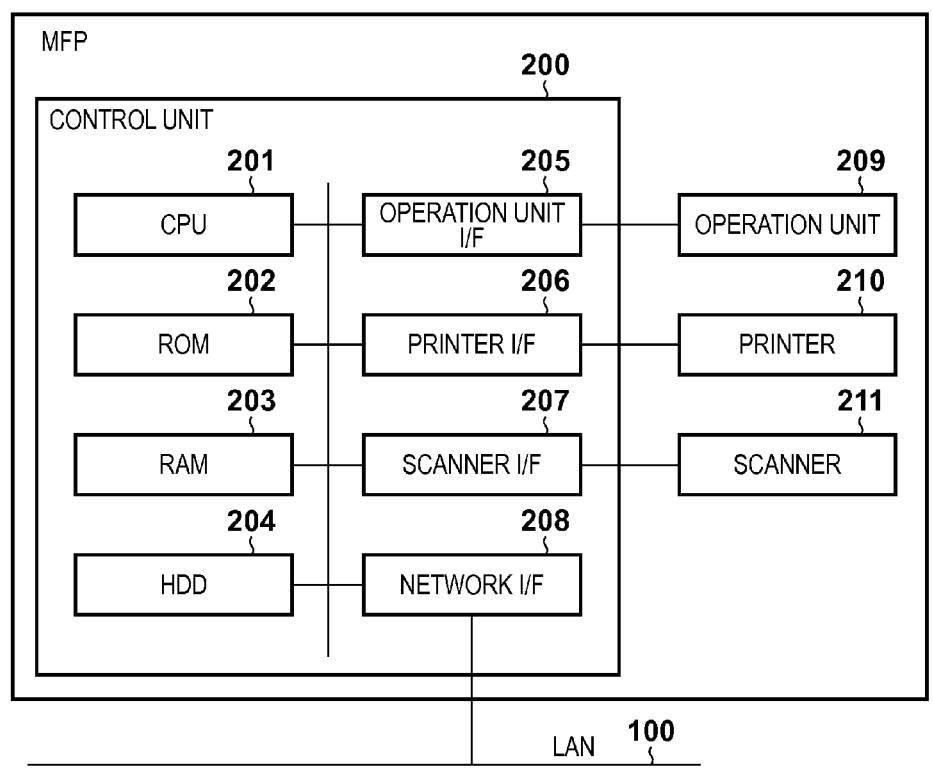
FIG. 2 is a block diagram showing an example of the hardware arrangement of an MFP.

FIG. 2 is a hardware block diagram showing the arrangement of each MFP. A description will be made here assuming that the MFPs shown in FIG. 1 have the same hardware arrangement. However, the present invention is not limited to this. A control unit 200 including a CPU 201 controls the operation of the entire MFP. The CPU 201 reads out control programs stored in a ROM 202 and performs various kinds of control such as reading and transmission. A RAM 203 is a storage unit and is used as a temporary storage area such as the main memory or work area of the CPU 201.

An HDD 204 stores image data and various programs. An operation unit I/F 205 connects an operation unit 209 and the control unit 200. A network I/F 208 connects the control unit 200 (MFP) to the LAN 100. The network I/F 208 transmits/receives various kinds of information to/from an external apparatus on the LAN 100.

A printer I/F 206 connects a printer 210 and the control unit 200. Image data to be printed by the printer 210 is transferred from the control unit 200 via the printer I/F 206 and printed by the printer 210 on a printing medium such as a paper sheet. A scanner I/F 207 connects a scanner 211 and the control unit 200. The scanner 211 reads an image on an original, generates image data, and inputs it to the control unit 200 via the scanner I/F 207.

[Software Configuration]

Figure 3:
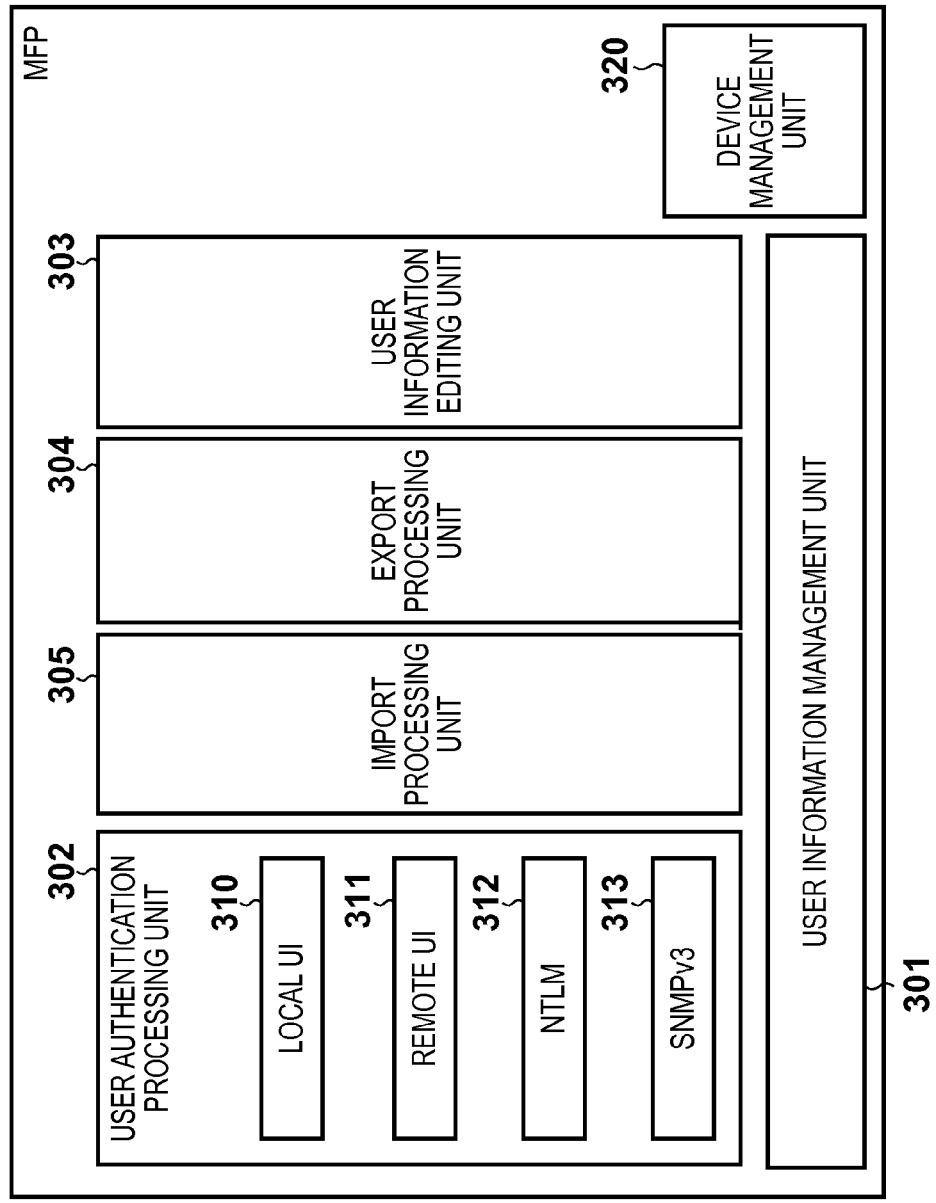
FIG. 3 is a block diagram showing an example of the software configuration of the MFP.

FIG. 3 is a block diagram showing a software configuration of each MFP according to the present invention. A description will be made here assuming that the MFPs shown in FIG. 1 have the same software configuration. However, the present invention is not limited to this.

A user information management unit 301 manages information necessary for authentication of a user who uses the MFP and information necessary for limitation, customization, and the like of the functions of the MFP for each authenticated user. As a point regarding the present invention, the password management method changes depending on the MFP type, as described in Description of the Related Art above. FIG. 6 shows an example of user information managed by the user information management unit 301. Identification information (account) that identifies a user is stored in user_id 601, a password hashed by MD5 is stored in password (MD5) 602, and a user's e-mail address is stored in e-mail 603. In the example of the user information management table shown in FIG. 6, each password is hashed by MD5 and managed in that state.

On the other hand, in the example of the user information management table shown in FIG. 7, each password is managed without hashing (password 702). That is, in the arrangement shown in FIG. 7, the identification information (user name) of a user, an unhashed password, a hashed password, and an e-mail address are managed in association with each other. When the user refers to the value of the password 702, the password can be recognized. In the example shown in FIG. 7, passwords hashed using MD4 and MD5 as hash functions can be managed. However, the present invention is not limited to this, and the user information management table may cope with other hash functions.

For example, in a large-scale office environment, all MFPs existing in the office environment are rarely purchased at once. As a result, MFPs purchased at different times and using different user information management methods may coexist. In this embodiment, the following explanation will be made assuming such a situation.

A user authentication processing unit 302 performs authentication processing for each MFP use means or protocol. A local UI 310 provides a UI (FIG. 4) for authentication to the user who uses the MFP from the operation unit 209, and performs authentication processing by checking user information managed by the user information management unit 301 based on input information.

Figure 5:
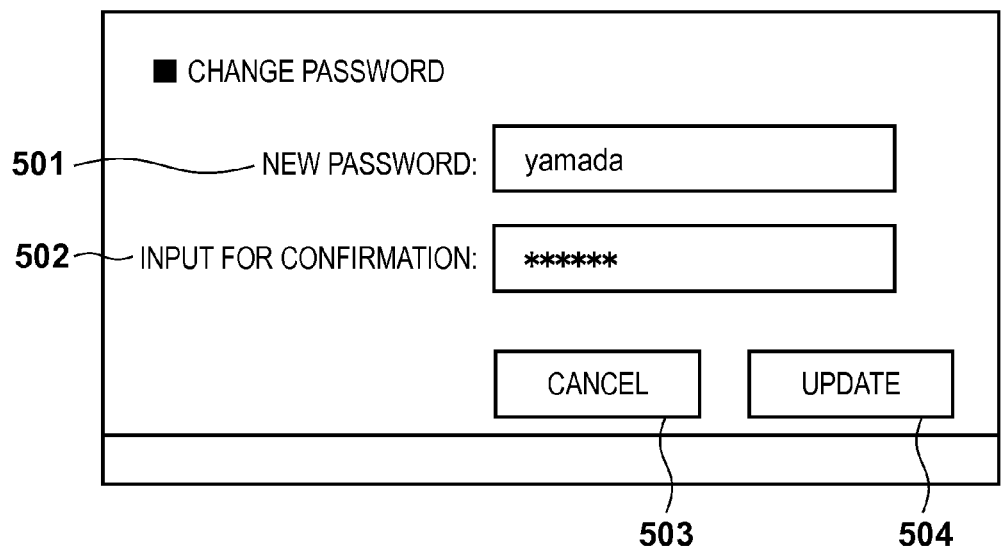
FIG. 5 is a view showing an example of a password change screen provided by a user information editing unit.

A remote UI 311 provides an authentication page and performs authentication processing when accessed using the web browser of a PC connected via the LAN 100 like the PC 150. An NTLM 312 and an SNMPv3 313 respectively perform NTLM (Windows NT LAN Manager) authentication and authentication processing when accessed using an SNMPv3 (Simple Network Management Protocol version 3) protocol. A user information editing unit 303 provides a UI used by the user to edit the information managed by the user information management unit 301. FIG. 5 shows an example of a UI serving as a screen to change a password.

An export processing unit 304 performs UI providing and processing necessary to extract (export) user information managed by the user information management unit 301 out of the MFP as a file. An example of the file format at the time of export is CSV (Comma Separated Values). In the export processing, hashing processing is performed for an unhashed password. This aims at preventing the password from being grasped by hashing because the password is data that even the administrator who performs the export processing should not know from the viewpoint of security even if the exported file itself is readable.

An import processing unit 305 performs UI providing and processing necessary to receive a user information file exported from another device and apply (import) it to the user information management unit 301.

Note that in this embodiment, a description will be made assuming the following management state.

MFPs 101, 102, and 103: manage a password without hashing (FIG. 7)

MFP 110: manage a password hashed by MD5 (FIG. 6)

[Processing of Imported User Information]

Figure 10:
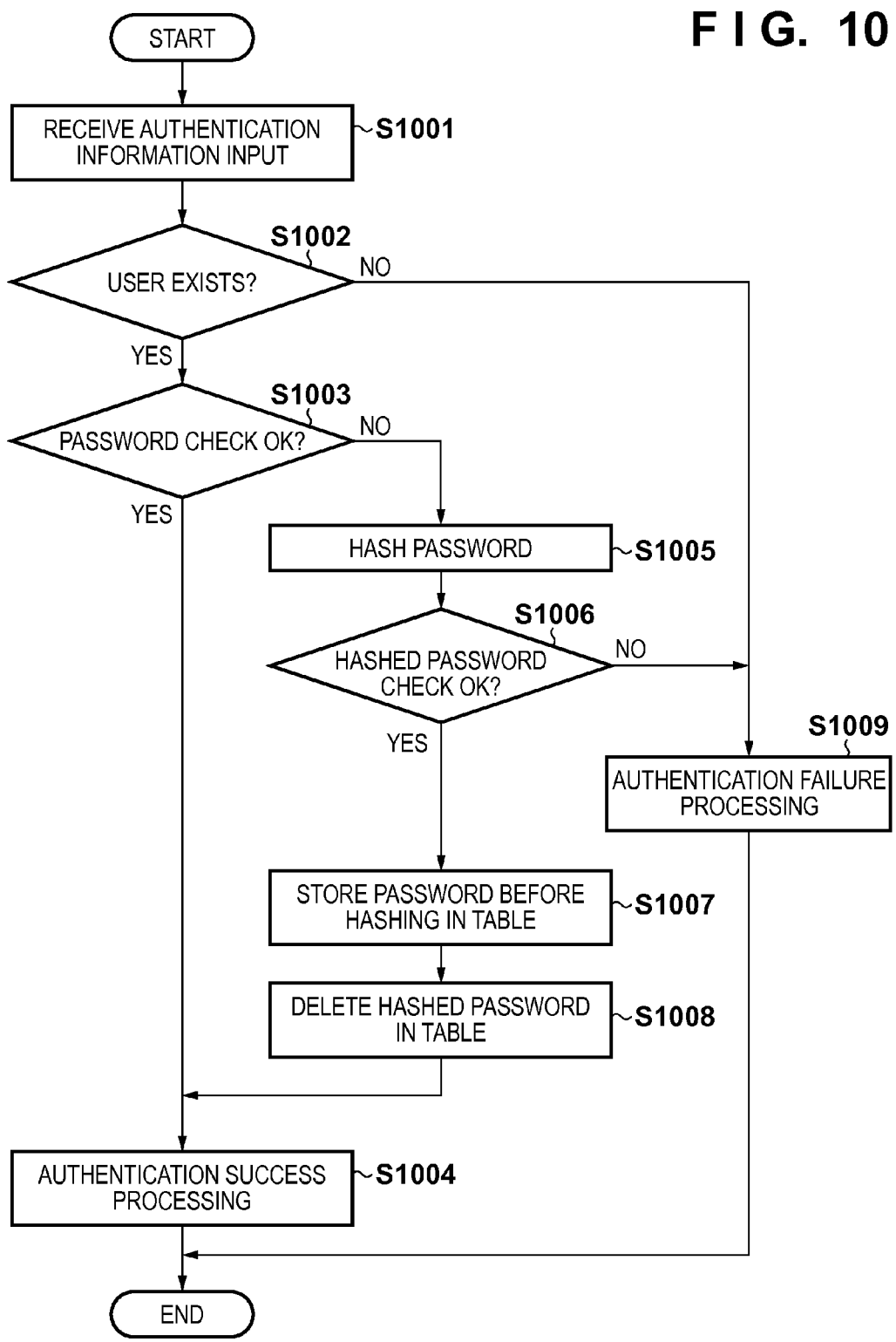
FIG. 10 is a flowchart according to the first embodiment.

FIG. 10 is a flowchart showing processing of imported user information using user authentication processing in the local UI 310 of the user authentication processing unit 302 of the MFP 101 as a trigger. This processing procedure is implemented by causing the CPU 201 of the MFP to read out a program stored in a storage unit such as the HDD 204 and execute it. A description will be made assuming that before the start of the flowchart, user information managed as shown in FIG. 6 in the MFP 110 is imported to the user information management unit 301 that manages the user as shown in FIG. 7. As the result of import, the password of the imported user is stored in a hashed state (password (MD5) 804 in FIG. 8).

In step S1001, the user authentication processing unit 302 acquires authentication information. More specifically, when the user inputs authentication information in an authentication screen (FIG. 4) and presses a login button 404 by operating the MFP from the operation unit 209, the authentication information is acquired. In step S1002, the user authentication processing unit 302 searches a table shown in FIG. 8 for a record in which a user name input to a user name 401 matches a user_id 801 in the table. If there exists no record whose user name matches (NO in step S1002), the user authentication processing unit 302 performs authentication failure processing in step S1009. After that, the processing procedure ends.

If there exists a record whose user name matches (YES in step S1002), in step S1003, the user authentication processing unit 302 searches the table for a record in which a password input to a password 402 matches a password 802 (unhashed password). If there exists a record whose password matches (YES in step S1003), the user authentication processing unit 302 performs processing of authentication success in step S1004. The processing of authentication success corresponds to processing of, for example, making the MFP usable for the user. As for the case where the passwords match in the example shown in FIG. 8, when "hasebe" and "haseb" are input to the user name 401 and the password 402, respectively, they match the set of the user_id 801 and the password 802 of the record, and the authentication succeeds.

If there exists no record whose password matches (NO in step S1003), in step S1005, the user authentication processing unit 302 hashes the input password by MD5. Note that MD5 is employed here because the method used by the MFP 110 is MD5. Hence, when importing an export file including a password converted using another hash function (one-way function), processing is performed in accordance with the function. In step S1006, the user authentication processing unit 302 searches the table for a record in which the password hashed in step S1005 matches the password (MD5) 804. If there exists no record whose hashed password matches (NO in step S1006), the user authentication processing unit 302 performs authentication failure processing in step S1009. After that, the processing procedure ends.

If there exists a record whose hashed password matches, that is, the user authentication succeeded (YES in step S1006), in step S1007, the user authentication processing unit 302 writes the password before hashing as the value of the password 802 of the detected record. In step S1008, the user authentication processing unit 302 deletes information (hashed password) written in the password (MD5) 804 of the detected record. After updating of the user information management unit 301 ends, the user authentication processing unit 302 performs processing of authentication success in step S1004. Then, the processing procedure ends.

This makes it possible to synchronize user information between a plurality of information processing apparatuses using different management methods for passwords under management.

Second Embodiment

The second embodiment of the present invention will be described. In the second embodiment, processing of imported user information is performed using user authentication when accessing from a web browser of a PC connected to a network to a web application of an MFP as a trigger.

Figure 11:
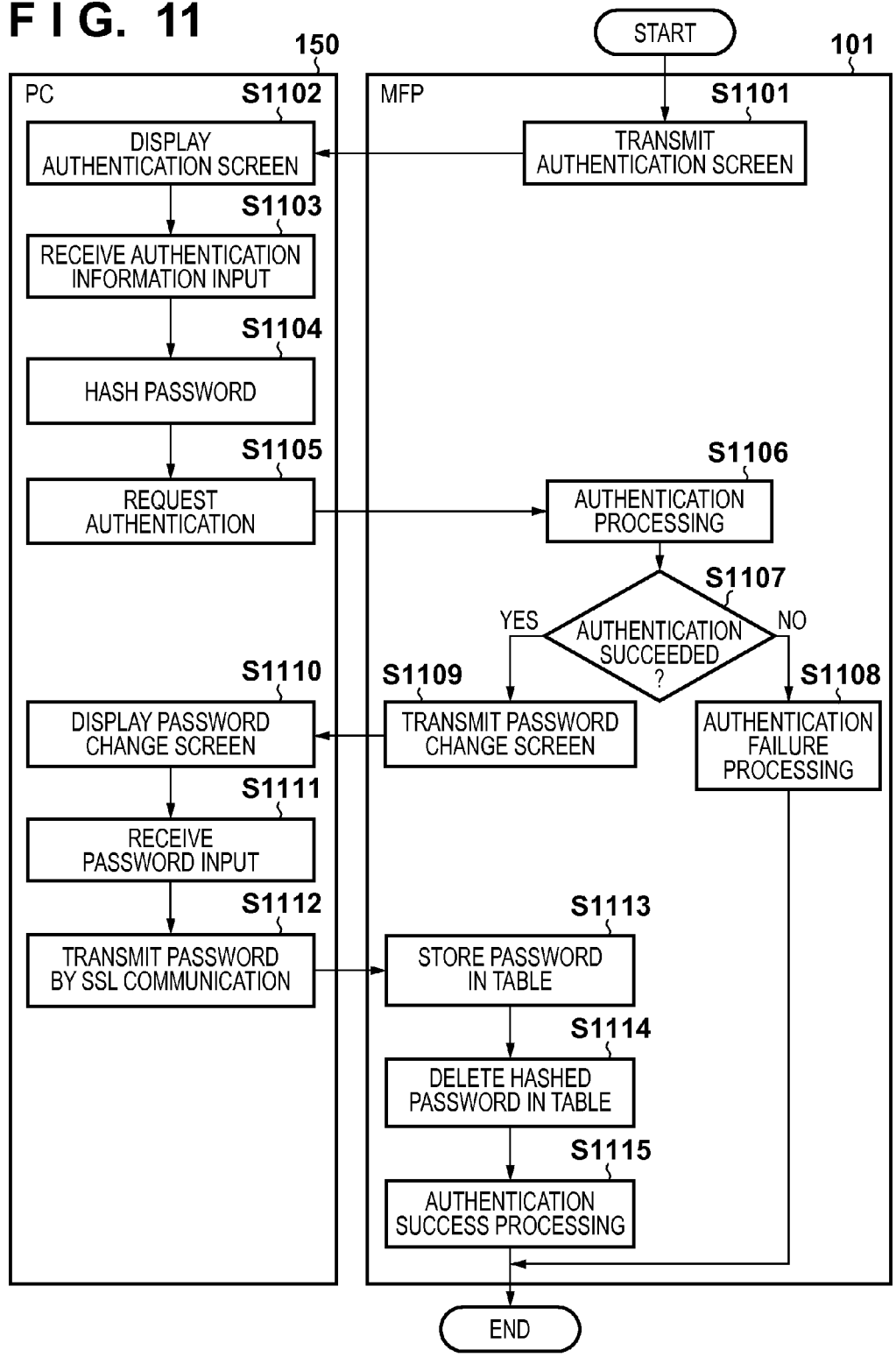
FIG. 11 is a flowchart according to the second embodiment.

FIG. 11 illustrates a procedure performed on a web browser (not shown) of a PC 150 and an MFP 101 according to this embodiment. This processing procedure is implemented by causing the CPU of each of the PC and the MFP to read out a program stored in a storage unit and execute it.

In step S1101, a remote UI 311 of a user authentication processing unit 302 of the MFP 101 transmits a web page for user authentication to the PC 150. The contents of the user authentication page used here are the same as the contents of a screen (FIG. 4) displayed on an operation unit 209 in the first embodiment. In step S1102, the web browser of the PC 150 displays the received user authentication page. After that, in step S1103, the web browser receives input of user authentication information.

In step S1104, the web browser hashes a password input by the user. Here, MD5 is used as the hashing method. In step S1105, the web browser sends, to the MFP 101, an authentication request using the hashed password and the user name.

The remote UI 311 of the user authentication processing unit 302 of the MFP 101 performs authentication processing based on the authentication request from the web browser of the PC 150. Note that in the above description, password hashing in the authentication processing is performed on the side of the PC 150, and the hashed password is transmitted to the MFP 101. Actually, two-way communication is performed by a protocol such as CRAM-MD5 to implement authentication.

In step S1107, the remote UI 311 of the user authentication processing unit 302 determines whether the authentication processing has succeeded. If the authentication processing has failed (NO in step S1107), in step S1108, the remote UI 311 of the user authentication processing unit 302 performs authentication failure processing of, for example, transmitting a page indicating the authentication failure. Then, the processing procedure ends.

If the authentication processing has succeeded (YES in step S1107), in step S1109, the remote UI 311 of the user authentication processing unit 302 transmits a password setting page (FIG. 5) to the PC 150.

In step S1110, the web browser of the PC 150 displays the password setting page (FIG. 5) received from the MFP 101. After that, in step S1111, the web browser receives input of a password from the user. Data input by the user here may be the same as that input at the time of authentication (step S1103) or a new password (for the purpose of changing the password). In step S1112, the web browser transmits the password input by the user to the MFP 101 by encrypted communication (for example, SSL (Secure Sockets Layer) communication). Since the communication path is encrypted, the password is transmitted in an unhashed state.

In step S1113, the remote UI 311 of the user authentication processing unit 302 writes the unhashed password received from the PC 150 as the value of a password 802 of the record of the user for which authentication of a user information management unit 301 has succeeded. In step S1114, the remote UI 311 of the user authentication processing unit 302 deletes information (that is, hashed password) written in a password (MD5) 804 of the record. After updating of the password in the table, the remote UI 311 of the user authentication processing unit 302 performs processing at the time of authentication success in step S1115. After that, the processing procedure ends.

The same effect as in the first embodiment can thus be obtained even when the processing is triggered by input from the PC.

Third Embodiment

The third embodiment of the present invention will be described. In the third embodiment, the trigger to update user information managed as a hashed password after import is not an MFP where the user information exists but another MFP connected to a network.

Figure 12:
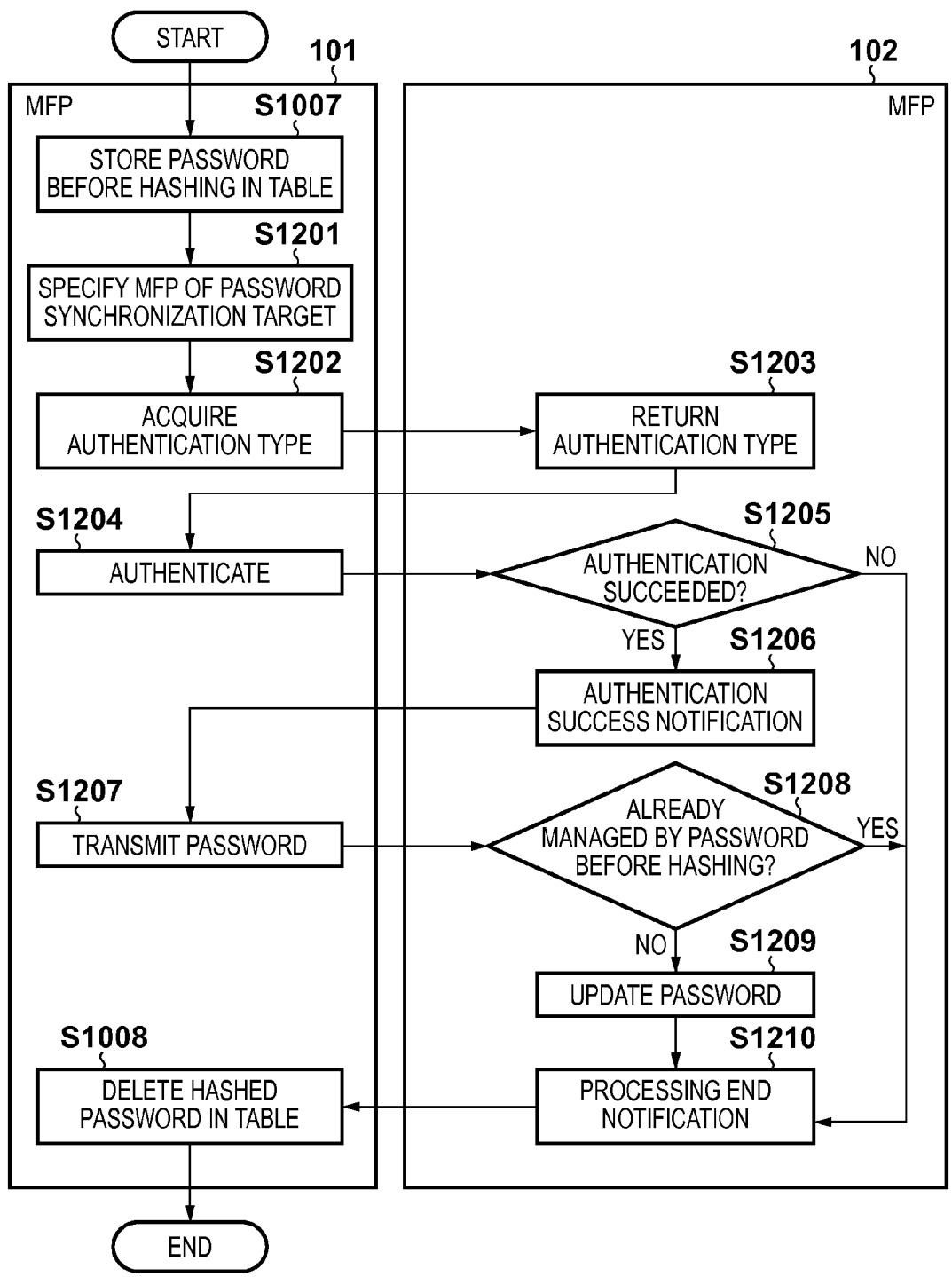
FIG. 12 is a flowchart according to the third embodiment.

FIG. 12 is a flowchart of updating a user information management unit 301 of an MFP 102 next to processing of updating the user information management unit 301 using authentication on an operation unit 209 of an MFP 101 as a trigger, as described in the first embodiment. That is, this is processing executed between the process of step S1007 and that of step S1008 in FIG. 10.

In step S1007, the user information management unit 301 of the MFP 101 updates the password of the record of a certain user. After that, in step S1201, the user information management unit 301 of the MFP 101 acquires, from a device management unit 320, an MFP that should similarly update the password. The MFP that should update the password may be managed statically as a database or obtained by dynamically searching for an MFP on the network. A description will be made here assuming that the MFP of the synchronization target is the MFP 102. The user information management unit 301 is assumed to transmit a password change request to the MFP 102 that should update the password. Note that the protocol of a web service is used between the MFP 101 and the MFP 102. In step S1202, the user information management unit 301 of the MFP 101 queries the MFP 102 about an authentication type, for example, what kind of hashing type is necessary as authentication information. In response to this query, a user authentication processing unit 302 of the MFP 102 returns the authentication type to the MFP 101 in step S1203.

In step S1204, the user information management unit 301 of the MFP 101 sends an authentication request to the MFP 102 based on the returned authentication type. In step S1205, the user authentication processing unit 302 of the MFP 102 performs authentication processing. If the authentication has failed (NO in step S1205), the user authentication processing unit 302 of the MFP 102 sends a processing end notification to the MFP 101 in step S1210. If the authentication has succeeded (YES in step S1205), the user authentication processing unit 302 of the MFP 102 notifies the MFP 101 of authentication success in step S1206.

After receiving the authentication success notification, the user information management unit 301 of the MFP 101 encrypts the communication path (for example, SSL communication), and transmits the unhashed password to the MFP 102 in step S1207.

After receiving the unhashed password, the user information management unit 301 of the MFP 102 confirms in step S1208 whether the password of the change target user is already managed without hashing. If the password is already managed (YES in step S1208), password change processing is unnecessary. Hence, the MFP 101 is notified of the end of processing in step S1210. If the password is not managed yet (NO in step S1208), the user information management unit 301 of the MFP 102 writes the received password as the value of a password 802 of the record of the corresponding user in step S1209. In addition, the user information management unit 301 of the MFP 102 deletes information (that is, hashed password) of a password (MD5) 804. In step S1210, the user information management unit 301 of the MFP 102 sends a processing end notification to the MFP 101.

Upon receiving the processing end notification from the MFP 102, the user information management unit 301 of the MFP 101 deletes information (that is, hashed password) written in the password (MD5) 804 of the record in step S1008.

Password updating in a certain MFP can thus trigger password synchronization in another MFP as well.

Fourth Embodiment

The fourth embodiment of the present invention will be described. In the fourth embodiment, when performing user information export processing, processing for the password of the user in the user information is performed based on the authentication information of the user who performs the export.

Figure 13:
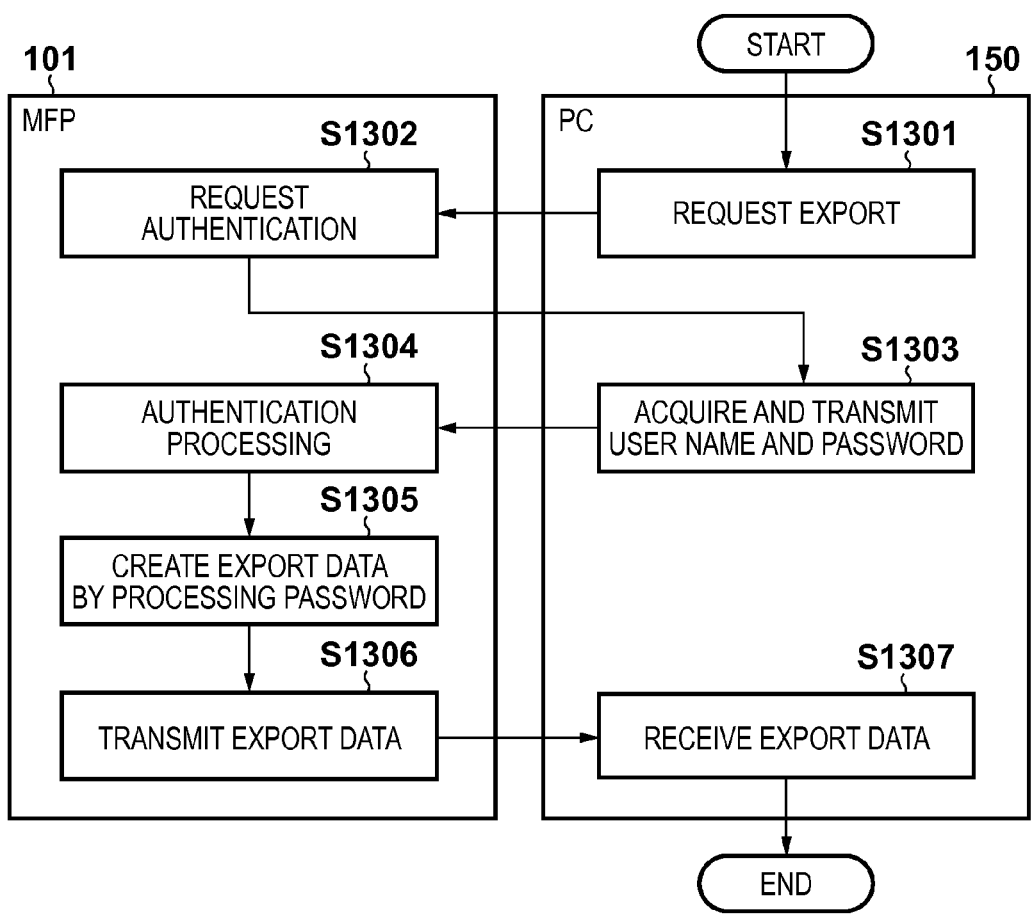
FIG. 13 is a flowchart according to the fourth embodiment.

FIG. 13 is a flowchart showing the procedure of processing when accessing from a PC 150 to an MFP 101 and exporting user information. This processing procedure is implemented by causing the CPU of each of the PC 150 and the MFP 101 to read out a program stored in a storage unit and execute it.

Figure 4:
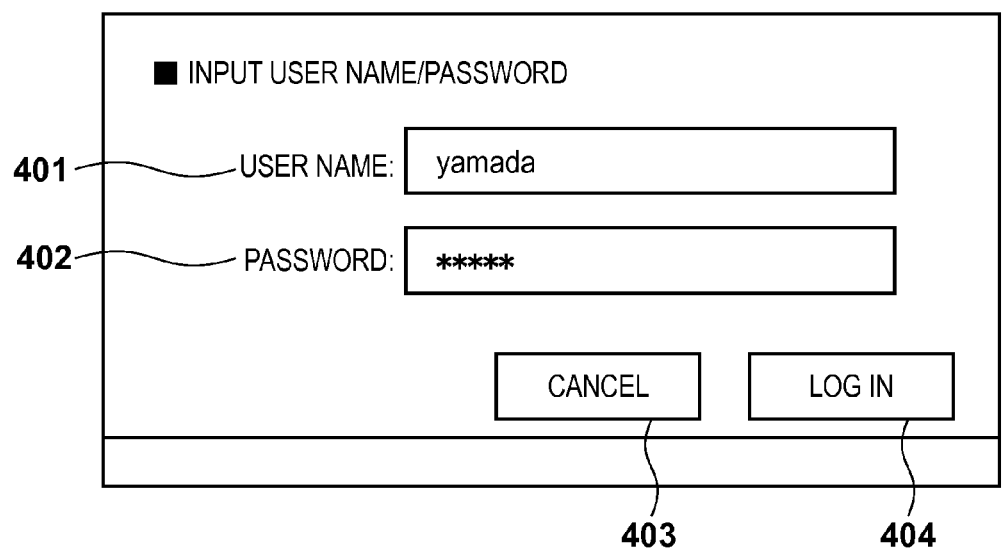
FIG. 4 is a view showing an example of a UI of user authentication provided by a user authentication processing unit.

In step S1301, the PC 150 sends a user information export request to the MFP 101. In step S1302, the MFP 101 sends an authentication request to the PC 150. In step S1303, the PC 150 receives a user name and a password from the user via an authentication screen (FIG. 4). The PC 150 encrypts the communication path (for example, SSL communication), and transmits the received password to the MFP 101 without hashing together with the user name.

In step S1304, the MFP 101 performs authentication processing using the received user name and the unhashed password. In step S1305, an export processing unit 304 of the MFP 101 creates export data from a user information management unit 301. If there exists an unhashed password, the export processing unit 304 performs hashing processing for the password. The password of the record specified by the user name (user_id) used for the authentication is not hashed. A description will be made using an example in which the user information management unit 301 manages all users using unhashed passwords, as shown in FIG. 15. In this case, when performing export processing using the user name "endo", the passwords other than "endo" are hashed in the export data, as shown in FIG. 16.

In step S1306, the MFP 101 transmits the created export data to the PC 150. In step S1307, the PC 150 receives the export data exported by the MFP 101. The processing procedure thus ends.

Fifth Embodiment

The fifth embodiment of the present invention will be described. In the fifth embodiment, when performing user information import processing, processing for the password of the user in the user information is performed on a PC based on the authentication information of the user who performs the import.

Figure 14:
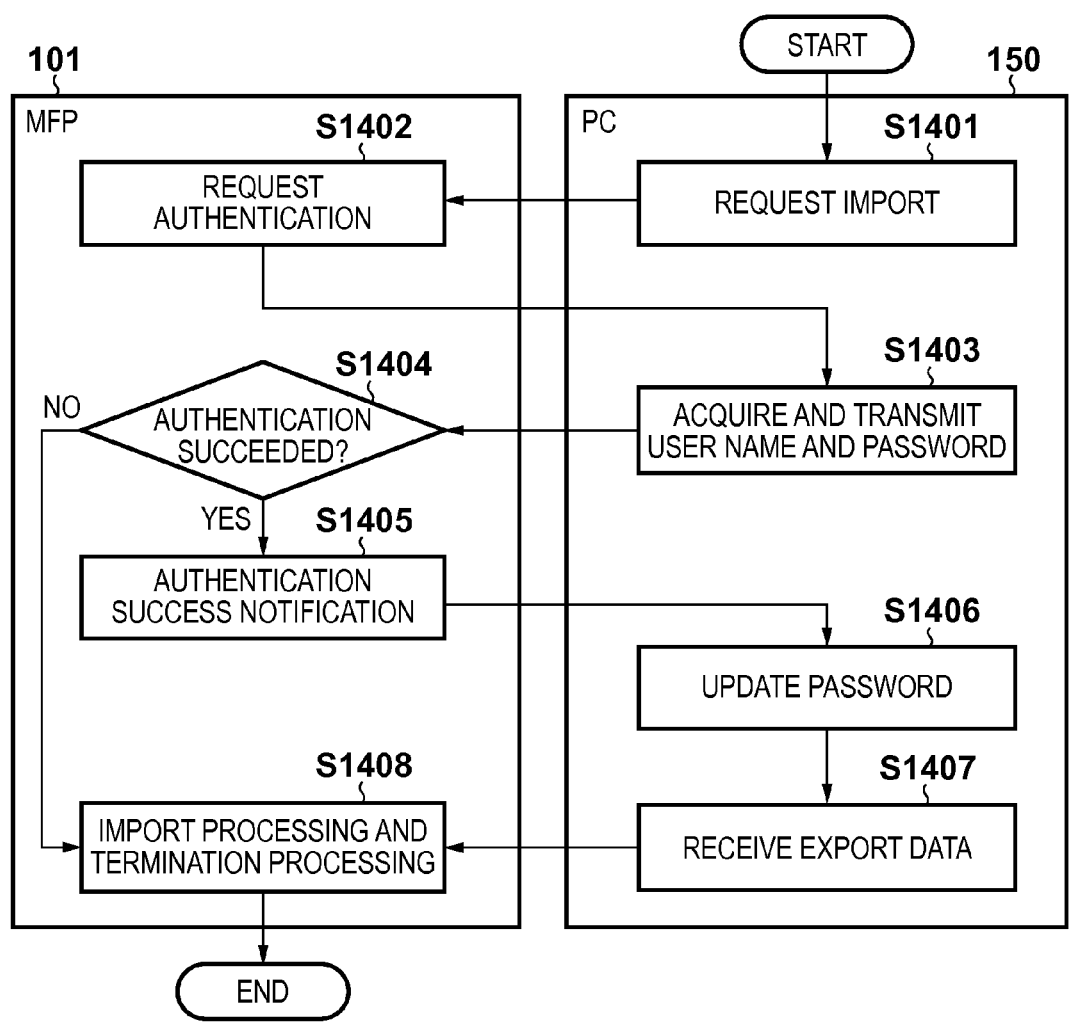
FIG. 14 is a flowchart according to the fifth embodiment.

FIG. 14 is a flowchart showing the procedure of processing when accessing from a PC 150 to an MFP 101 and importing user information. This processing procedure is implemented by causing the CPU of each of the PC 150 and the MFP 101 to read out a program stored in a storage unit and execute it.

In step S1401, the PC 150 sends a user information import request to the MFP 101. In step S1402, the MFP 101 transmits an authentication request to the PC 150 in response to the import request received from the PC 150. In step S1403, the PC 150 receives a user name and a password from the user via an authentication screen (FIG. 4). The PC 150 encrypts the communication path (for example, SSL communication), and transmits the received password to the MFP 101 without hashing together with the user name.

In step S1404, the MFP 101 performs authentication using the received password and user name. If the authentication has succeeded (YES in step S1404), the MFP 101 sends an authentication success notification to the PC 150 in step S1405.

After receiving the authentication success notification, in step S1406, the PC 150 updates the password of the record corresponding to the user name (user_id) of the user used for the authentication to the unhashed password acquired by input of the user in step S1403. For example, in import data at the time of step S1401, the passwords of all users are hashed, as shown in FIG. 17. In this state, when performing import processing using the user name "endo", the password of "endo" is updated to an unhashed state, as shown in FIG. 16.

In step S1407, the PC 150 transmits the updated import data to the MFP 101. In step S1408, the MFP 101 performs import processing and termination processing using the received import data.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-264506, filed Dec. 20, 2013, which is hereby incorporated by reference herein in its entirety.

What is claimed is:

1. An information processing apparatus comprising at least one processor and at least one memory coupled to the at least one processor, cooperating to act as units comprising:

an import unit configured to import first converted authentication information converted by another information processing apparatus using a one-way function, the first converted authentication information being associated with user identification information;

a receiving unit configured to receive, from a user, input of user identification information and authentication information;

an authentication unit configured (a) to execute first user authentication by checking information corresponding to the received authentication information, without converting using the one-way function, against information stored in a storage unit in association with the user identification information received by the receiving unit, and (b) in a case where it is determined by the first user authentication that the information corresponding to the received authentication information is not stored in the storage unit, to execute second user authentication by converting, using the one-way function, the received authentication information into second converted authentication information and checking the second converted authentication information against the first converted authentication information imported by the import unit in association with the user identification information received by the receiving unit; and a storage control unit configured, based on success of the second user authentication by the authentication unit, to cause the storage unit to store the authentication information without converting using the one-way function.

2. The information processing apparatus according to claim 1, wherein the storage unit stores the imported first converted authentication information, and
  wherein the storage control unit deletes the first converted authentication information in accordance with success of the second user authentication by the authentication unit,
  wherein the second user authentication succeeds if the second converted authentication information corresponds to the first converted authentication information imported by the import unit in association with the user identification information received by the receiving unit.

3. The information processing apparatus according to claim 1, wherein the import unit is configured to import the first converted authentication information from the another information processing apparatus, the another information processing apparatus using an authentication process different from that of the information processing apparatus.

4. The information processing apparatus according to claim 1, wherein the at least one processor and the at least one memory further cooperate to act as units comprising:
  a providing unit configured to provide, to the another information processing apparatus, a screen used to input the user identification information and the authentication information,
  wherein the authentication unit receives the input of the user identification information and the authentication information from the another information processing apparatus via the screen.

5. The information processing apparatus according to claim 4, wherein the providing unit further provides, to the another information processing apparatus, a screen used to change the authentication information stored in the storage unit.

6. The information processing apparatus according to claim 4, wherein, when transmitting the authentication information input via the screen provided by the providing unit, the another information processing apparatus transmits the input authentication information by encrypted communication or converts the input authentication information using the one-way function and transmits the authentication information.

7. The information processing apparatus according to claim 6, wherein, when transmitting the authentication information input via the screen provided by the providing unit, the another information processing apparatus to which the screen is provided converts the input authentication information using the one-way function and transmits the authentication information, and if the second user authentication by the authentication unit using the converted authentication information from the another information processing apparatus has succeeded, the another information processing apparatus transmits the input authentication information by encrypted communication.

8. The information processing apparatus according to claim 1, wherein the at least one processor and the at least one memory further cooperate to act as units comprising:
  a specifying unit configured, triggered by the storage of the authentication information that is not converted using the one-way function by the storage control unit, to specify an apparatus that can communicate to the information processing apparatus and synchronizes information stored in the storage unit; and
  a transmission unit configured to transmit the authentication information stored in the storage unit, which is not converted using the one-way function, by encrypted communication to the apparatus specified by the specifying unit.

9. The information processing apparatus according to claim 1, wherein the at least one processor and the at least one memory further cooperate to act as units comprising:
  an export unit configured to export information stored in the storage unit,
  wherein, when performing the export, the export unit (a) performs the user authentication by the authentication unit, (b) exports, out of the information stored in the storage unit, authentication information that is not converted the one-way function for a user who is authenticated by the authentication unit, and (c) exports the first converted authentication information converted using the one-way function for a user who is not authenticated by the authentication unit.

10. The information processing apparatus according to claim 1, wherein, when importing information to be exported by the another information processing apparatus, the import unit performs the user authentication by the authentication unit, and
  wherein the another information processing apparatus exports authentication information that is not converted using the one-way function for a user who is authenticated by the user authentication, and exports the authentication information converted using the one-way function for a user who is not authenticated.

11. The information processing apparatus according to claim 1, wherein any one of a plurality of types of hash functions is used as the one-way function.

12. An information processing method of an information processing apparatus, the information processing method comprising:
  importing a first converted authentication information converted by another information processing apparatus using a one-way function, the first converted authentication information being associated with user identification information;
  receiving, from a user, input of user identification information and authentication information;
  executing first user authentication by checking information corresponding to the received authentication information, without converting using the one-way function, against information stored in a storage unit in association with the user identification information received in the receiving;
  executing, in a case where it is determined by the first user authentication that the information corresponding to the received authentication information is not stored in the storage unit, second user authentication by (a) converting, using the one-way function, the received authentication information into second converted authentication information and (b) checking the second converted authentication information against the first converted authentication information imported in the importing in association with the input user identification information received in the receiving; and
  causing, based on success of the second user authentication, the storage unit to store the authentication information without converting using the one-way function.

13. A non-transitory computer-readable medium storing a program that causes an information processing apparatus to function as units comprising:
  an import unit configured to import a first converted authentication information converted by another information processing apparatus using a one-way function, the first converted authentication information being associated with user identification information;

a receiving unit configured to receive, from a user, input of user identification information and authentication information;

an authentication unit configured to (a) execute first user authentication by checking information corresponding to the received authentication information, without converting using the one-way function, against information stored in a storage unit in association with the user identification information received by the receiving unit, and (b) in a case where it is determined by the first user authentication that the information corresponding to the received authentication information is not stored in the storage unit, execute second user authentication by converting, using the one-way function, the received authentication information into second converted authentication information and checking the second converted authentication information against the first converted authentication information imported by the import unit in association with the user identification information received by the receiving unit; and a storage control unit configured, based on success of the second user authentication by the authentication unit, to cause the storage unit to store the authentication information without converting using the one-way function.

14. An information processing apparatus comprising at least one processor and at least one memory coupled to the at least one processor, cooperating to act as units comprising:

an import unit configured to import first converted authentication information converted by another information processing apparatus using a one-way function, the first converted authentication information being associated with user identification information;

a receiving unit configured to receive, from a user, user identification information and authentication information;

an authentication unit configured (a) to execute first user authentication verifying the received authentication information which is not converted using the one-way function and information stored in a storage unit in association with the user identification information received by the receiving unit, and (b) in a case where the verification in the first user authentication is not successful, to execute second user authentication verifying second converted authentication information which is generated by converting the received authentication information using the one-way function and the first converted authentication information imported by the import unit in association with the user identification information received by the receiving unit; and a storage control unit configured, based on success of verification in the second user authentication by the authentication unit, to cause the storage unit to store the authentication information not converted using the one-way function.

\* \* \* \* \*